(12) United States Patent  (10) Patent No.: US 8,970,925 B2
Lah  (45) Date of Patent: Mar. 3, 2015

(54) SCANNER FOR AUTOMATICALLY DETECTING OBJECT TO BE SCANNED AND SCANNING METHOD USING SAME

(75) Inventor: Jong Kook Lah, Seoul (KR)

(73) Assignee: Wisecube Co., Ltd., Seoul (KR)

( * ) Notice: Subject to any disclaimer, the term of this patent is extended or adjusted under 35 U.S.C. 154(b) by 0 days.

(21) Appl. No.: 14/233,648

(22) PCT Filed: Jul. 20, 2012

(86) PCT No.: PCT/KR2012/005807
§ 371 (c)(1),
(2), (4) Date: Jan. 17, 2014

(87) PCT Pub. No.: WO2013/012282
PCT Pub. Date: Jan. 24, 2013

(65) Prior Publication Data
US 2014/0153067 A1 Jun. 5, 2014

(30) Foreign Application Priority Data

Jul. 20, 2011 (KR) ........................ 10-2011-0071945

(51) Int. Cl.
*H04N 1/04* (2006.01)
*H04N 1/00* (2006.01)
*H04N 1/40* (2006.01)
*H04N 1/10* (2006.01)
*H04N 1/193* (2006.01)

(52) U.S. Cl.
CPC ....... *H04N 1/00702* (2013.01); *H04N 1/00689* (2013.01); *H04N 1/00737* (2013.01); *H04N 1/00748* (2013.01); *H04N 1/0075* (2013.01); *H04N 1/00758* (2013.01); *H04N 1/00782* (2013.01); *H04N 1/00742* (2013.01); *H04N 2201/0081* (2013.01); *H04N 1/1017* (2013.01); *H04N 1/1026* (2013.01); *H04N 1/103* (2013.01); *H04N 1/193* (2013.01)
USPC ............ 358/488; 358/449; 358/475; 358/474

(58) Field of Classification Search
CPC ........... H04N 1/04; H04N 1/028; H04N 1/00; G06K 9/20; G03B 27/62
See application file for complete search history.

(56) References Cited

U.S. PATENT DOCUMENTS

| 5,568,281 | A | 10/1996 | Kochis et al. |
| 6,753,982 | B1 | 6/2004 | Sheng et al. |
| 2010/0195167 | A1* | 8/2010 | Yokochi ........................ 358/475 |
| 2011/0228349 | A1* | 9/2011 | Iwayama et al. .............. 358/474 |

FOREIGN PATENT DOCUMENTS

| JP | 2005-266352 A | 9/2005 |
| KR | 10-2005-0046969 A | 5/2005 |
| KR | 10-2008-0069796 A | 7/2008 |

* cited by examiner

*Primary Examiner* — Fred Guillermety
*Assistant Examiner* — Henok A Shiferaw
(74) *Attorney, Agent, or Firm* — Rabin & Berdo, P.C.

(57) ABSTRACT

A scanner for automatically detecting a scan target includes a transparent scan region configured to support the target, an image sensor including a light source for irradiating light toward the scan region and a light receiving element array for sensing the incident light through the scan region, a drive unit configured to linearly move the sensor across the scan region, and a control unit that controls the sensor and the drive unit. The control unit controls the light source of the sensor and the drive unit such that the sensor moves to a detection position and then the array senses the incident light through the scan region with the light source turned on and off. The control unit compares output signals of the array obtained by turning on and off the light source and automatically determines, based on the comparison, whether the target is placed in the scan region.

6 Claims, 8 Drawing Sheets

(a)

(b)

(a)

(b)

(a)

(b)

SCANNER FOR AUTOMATICALLY DETECTING OBJECT TO BE SCANNED AND SCANNING METHOD USING SAME

TECHNICAL FIELD

The present invention relates to a scanner and, more particularly, to a scanner that performs a scan by automatically detecting whether a scan target is positioned in a document scan region of the scanner and a scan method using the scanner.

BACKGROUND ART

A scanner is an image input device that optically scans a medium such as a document, a drawing, a photograph, a film or the like and inputs a digital image by converting analog signals indicative of the intensity of the light reflected from or passed through the medium to digital signals.

In general, a user of a scanner brings a scan target such as a document or the like onto a transparent scan region of a scanner and covers the scan region with a cover for cutting an external disturbing light. If a switch is pressed subsequently, an image sensor, e.g., a one-dimensional array of charge coupled devices (CCDs) or amorphous semiconductors, is parallel-moved so that the scanner can two-dimensionally scan one surface of the medium.

In case of a medium having a size of a credit card, e.g., an identification card or a name card, one surface of the medium is scanned while loading the medium to a scanner whose image sensor is kept stopped.

However, in a process requiring a high processing speed, e.g., an immigration inspection process in which a passport presented by a tourist is scanned to read a passport number or the like written in a machine-readable zone of the passport, it is cumbersome to close a scanner cover and to press a switch, which may significantly reduce the work efficiency.

In an effort to solve this problem, U.S. Pat. Nos. 6,753,982 and 5,568,281 disclose a scanner that includes an additional means capable of automatically detecting whether a scan target is positioned in a scan region.

However, the scanner of the patents cited above is complex in structure and costly to manufacture because of the provision of the additional detecting means. If the scanner is used without closing the cover, there is a possibility that, under the influence of natural light or artificial illumination light, a scan target not positioned in a scan region may be recognized as if it is positioned in the scan region. In addition, it is not easy to confirm whether a scan target is positioned in a right position.

SUMMARY OF THE INVENTION

In view of the problems noted above, it is an object of the present invention to provide a scanner which can omit a process of closing a cover and pressing a switch and which can automatically detect and scan a scan target placed on a scan region, and a scan method using the scanner.

Another object of the present invention is to provide a scanner and a scan method capable of avoiding an erroneous operation caused by external disturbing light and capable of detecting whether a scan target is positioned in a right position.

According to one aspect of the present invention, there is provided a scanner for automatically detecting a scan target, including: a transparent scan region configured to support the scan target; an image sensor including a light source for irradiating light toward the scan region and a light receiving element array for sensing the light incident thereon through the scan region; a drive unit configured to linearly move the image sensor across the scan region; and a control unit configured to control the image sensor and the drive unit, wherein the control unit is configured to control the light source of the image sensor and the drive unit such that the image sensor moves to a detection position and then the light receiving element array senses the light incident thereon through the scan region with the light source turned on and off, the control unit configured to compare output signals of the light receiving element array obtained by turning on and off the light source and to automatically determine, based on a result of the comparison, whether the scan target is placed in the scan region.

In the scanner, the control unit may be configured to determine whether the scan target is correctly placed, by comparing output signal values obtained from individual light receiving elements of the light receiving element array with the light source turned on and output signal values obtained from the individual light receiving elements of the light receiving element array with the light source turned off.

In the scanner, the image sensor may be a contact image sensor including a lens array for transmitting the light incident thereon through the scan region to the light receiving element array.

According to another aspect of the present invention, there is provided a scan method using a scanner provided with a transparent scan region for supporting a scan target, including: step (a) of providing a scanner which includes an image sensor including a light source for irradiating light toward the scan region and a light receiving element array for sensing the light incident thereon through the scan region, a drive unit configured to linearly move the image sensor across the scan region, and a control unit configured to control the image sensor and the drive unit; step (b) of controlling the light source of the image sensor and the drive unit such that the image sensor moves to a detection position and then the light receiving element array senses the light incident thereon through the scan region with the light source turned on and off, and obtaining output signals of the light receiving element array with the light source turned on and off; and step (c) of comparing the output signals of the light receiving element array obtained by turning on and off the light source and determining, based on a result of the comparison, whether the scan target is placed in the scan region.

In the method, the step (c) may be a step of determining whether the scan target is placed in the scan region, by comparing a differential value obtained by subtracting an output signal value of the light receiving element array available when the light source is turned off, from an output signal value of the light receiving element array available when the light source is turned on, with a predetermined value.

The method may further include: step (d) of determining whether the scan target is correctly placed, by comparing output signal values obtained from individual light receiving elements of the light receiving element array with the light source turned on and output signal values obtained from the individual light receiving elements of the light receiving element array with the light source turned off.

In the method, if it is determined in the step (d) that the scan target is not correctly placed, the steps (b) and (c) may be repeated after waiting for a predetermined time such that the scan target is correctly placed.

The scanner and scan method according to the present invention can omit a process of closing a cover and pressing a switch and can automatically detect and scan a scan target upon placing the scan target on a scan region. This enables a user to easily and rapidly perform a scan operation with one hand. Moreover, it is possible to prevent an erroneous operation otherwise caused by external disturbing light and to detect whether a scan target is positioned in a right position. This helps a user to perform an accurate and precise scan operation. Since there is installed no additional detecting means, the scanner is simple in structure and is cost-effective.

DETAILED DESCRIPTION OF THE PREFERRED EMBODIMENTS

Figure 1:
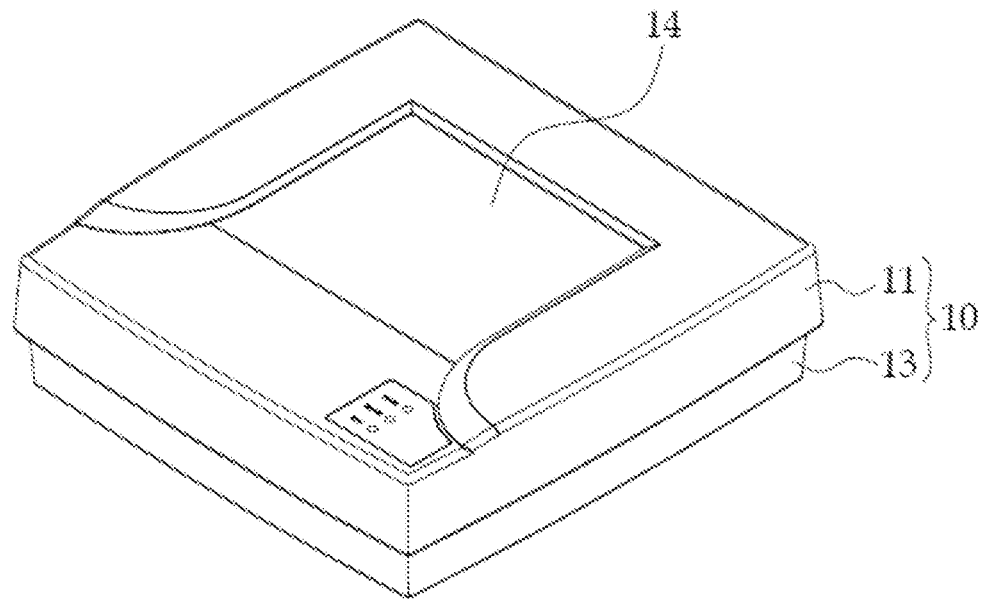
FIG. 1 is a perspective view showing the external configuration of a scanner according to the present invention.

One embodiment of the present invention will now be described in detail with reference to the accompanying drawings.

The embodiment to be described below is presented by way of example in an effort to sufficiently transfer the concept of the present invention to those skilled in the relevant art. Therefore, the present invention is not limited to the following embodiment but may be embodied in many other forms. In the accompanying drawings, the width, length and thickness of the components may be illustrated on an exaggerated scale for the sake of convenience. Throughout the specification and the drawings, the same components will be designated by like reference numerals.

Figure 2:
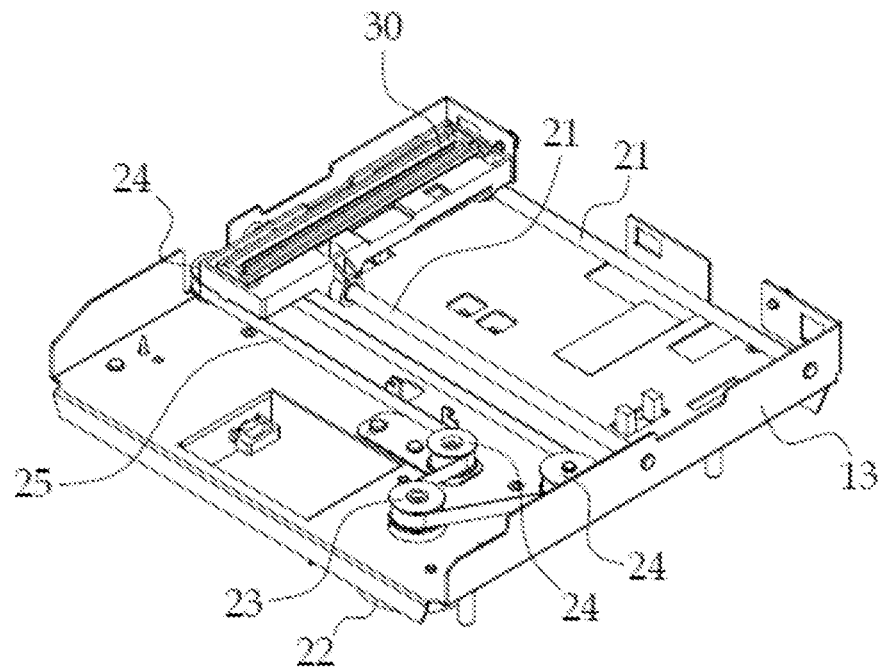
FIG. 2 is a perspective view of the scanner shown in FIG. 1, with an upper case removed.

Referring to FIGS. 1 and 2, the scanner of the present invention includes a case 10, a drive unit 20, an image sensor 30 and a control unit (not shown).

The case 10 includes an upper case 11 and a lower case 13. The upper case 11 is made of transparent glass and is provided with a scan region 14 for supporting a scan target.

The drive unit 20 includes a pair of guide shafts 21, a drive motor 22, a driving pulley 23, idle pulleys 24, and a timing belt 25. The guide shafts 21 are installed side by side within the lower case 13. The guide shafts 21 serve to guide the image sensor 30 so as to linearly move across the scan region 14.

The drive motor 22 is installed at one corner of the lower case 13. The driving pulley 23 is coupled to a driving shaft of the drive motor 22. The timing belt 25 is wound around the driving pulley 23 and is moved along with the rotation of the drive motor 22. The moving direction of the timing belt 25 is changed by the idle pulleys 24. In a certain section, the timing belt 25 travels parallel to the guide shafts 21. The timing belt 25 is coupled with the image sensor and is configured to deliver drive power to the image sensor 30 so that the image sensor 30 can linearly move along the guide shafts 21.

The operation of the drive unit 20 will be briefly described. If the drive motor 22 rotates in the forward direction, the driving pulley 23 coupled to the driving shaft of the drive motor 22 is rotated to cause the timing belt 25 to travel. The moving direction of the timing belt 25 is changed by the idle pulleys 24 so that the timing belt 25 can travel parallel to the guide shafts 21. The image sensor 30 coupled with the timing belt 25 is linearly moved along the guide shafts 21. Upon finishing a scan operation, an electric current of the opposite polarity is applied to the drive motor 22, thereby returning the image sensor 30 to the original position.

Figure 3:
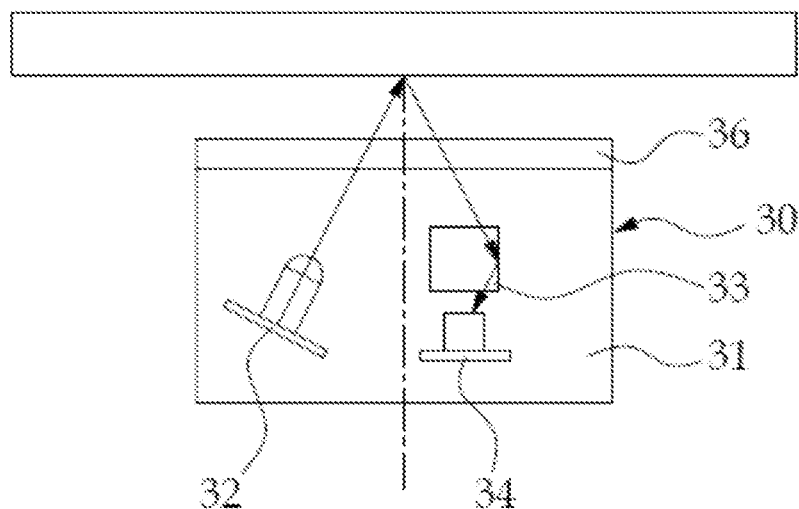
FIG. 3 is a view schematically illustrating the configuration of an image sensor employed in the scanner shown in FIG. 1.

Referring to FIG. 3, the image sensor 30 includes a body 31, a light emitting diode array 32 as a light source, a lens array 33 and a light receiving element array 34. In the present embodiment, the image sensor 30 is a contact image sensor.

The body 31 is made of a plastic. A transparent glass sheet 36 is installed in an upper opening of the body 31. The body 31 accommodates the light emitting diode array 32 and the lens array 33. The light emitting diode array 32 is fixed to the lower portion of the transparent glass sheet 36 installed in the upper opening of the body 31. The light emitting diode array 32 serves to irradiate light toward a scan target.

The lens array 33 serves to collect the light reflected from the surface of the scan target and to send the collected light to the light receiving element array 34. The lens array 33 may be configured by a gradient-index (GRIN) rod lens array which is abbreviated as a "GRIN lens array". In general, the gradient-index rod lens array is called a Selfoc Lens (product name). One end of the lens array 33 faces toward the scan region 14 and the other end thereof faces toward the light receiving element array 34.

The light receiving element array 34 is composed of a CCD (Charge Coupled Device), a CMOS (Complementary Metal Oxide Semiconductor) or the like. The light receiving element array 34 serves to convert an optical signal transmitted through the lens array 33 to an electrical signal.

Next, the operation principle of the image sensor 30 will be described. A contact image sensor as the image sensor 30 performs photoelectric conversion. The light irradiated from the light emitting diode array 32 toward the scan region 14 is reflected by the scan target and is transmitted to the light receiving element array 34 through the lens array 33.

The light arriving at the light receiving element array generates different optical outputs depending on the gradation of the scan target. Thus, the photoelectric current converted by the light receiving element array 34 shows a difference depending on the gradation of the scan target. A photo-electrically converted signal is inputted to, and amplified by, a signal processing unit. The signal thus amplified is converted to an output signal having a high S/N (signal/noise) ratio. The output signal thus converted is finally transmitted to a control unit through a printed circuit board, on which the light receiving element array 34 is installed, and a connector (not shown).

The control unit includes a microprocessor and a memory, both of which are installed on the printed circuit board. The control unit analyzes the output signal as an electric signal transmitted from the light receiving element array 34 and controls a power supply connected to the light source 32 and a power supply connected to the drive motor 22.

Figure 4:
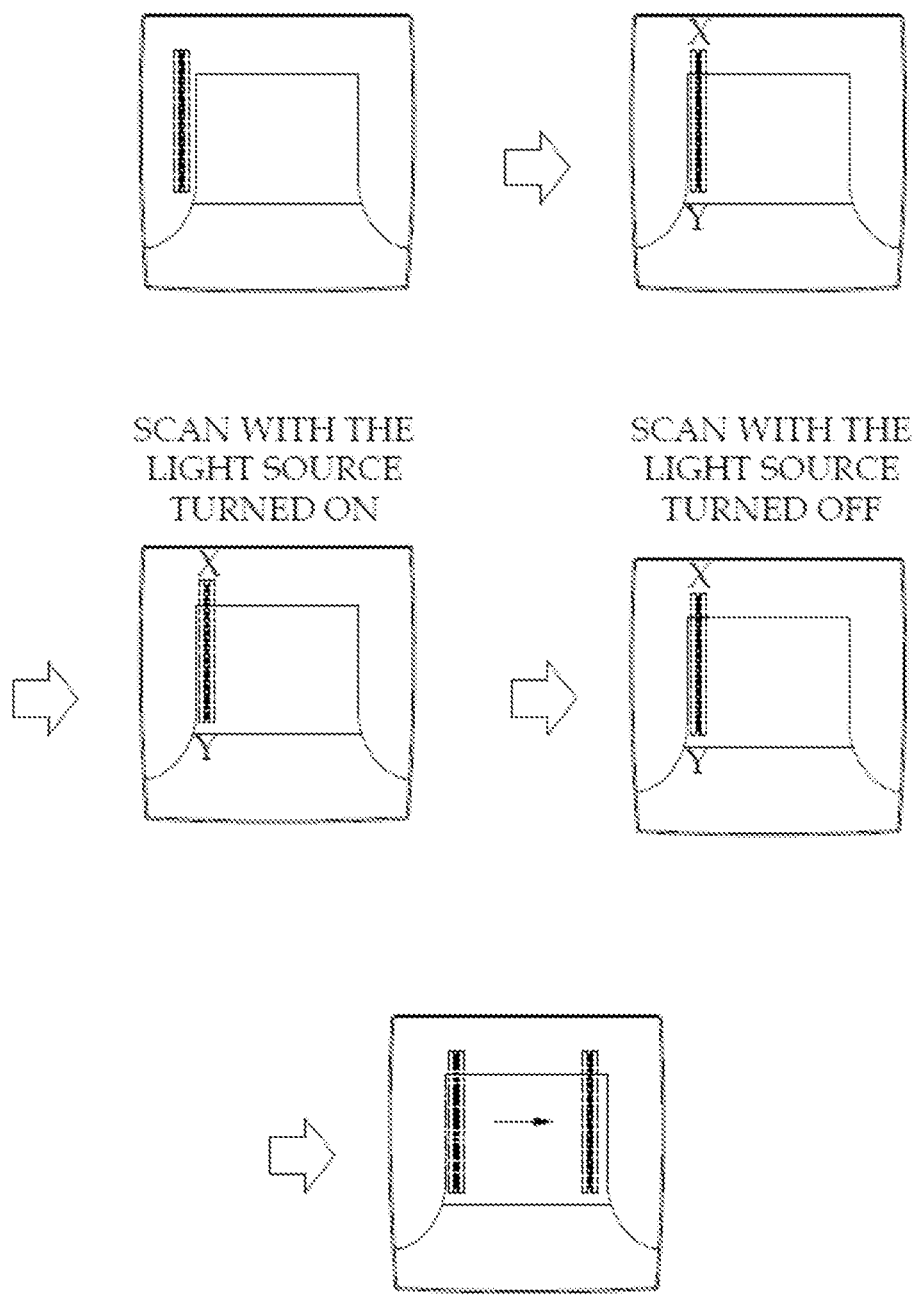
FIG. 4 is a view for explaining the operation of the scanner shown in FIG. 1.

As shown in FIG. 4, when the scanner is in a standby state, the control unit operates the drive motor 22 to move the image sensor 30 to a detection position. Thereafter, the control unit causes the one-dimensionally arranged light receiving element array 34 to scan a line between X and Y points with the light source 32 turned on and then to scan the line between the X and Y points with the light source 32 turned off, thereby determining whether the scan target is placed in the scan region 14. If it is determined that the scan target is placed in the scan region 14, the control unit causes the light receiving element array 34 to scan the entire scan region 14.

In the present embodiment, the detection position refers to the position of the image sensor 30 where the image sensor 30 can detect whether the scan target is placed or not. The detection position may be any position where the image sensor 30 is covered by the scan target.

In general, the detection position is set to become a position spaced apart about 10 mm from a start point of the scan region 14 (the glass surface of the scanner). If one line is scanned in the detection position using the one-dimensionally arranged light receiving element array 34, it is possible to obtain a one-dimensional output value. Based on this one-dimensional output value, it is possible to determine whether the scan target is positioned or not, whether the scan target is positioned in alignment with the upper end of the scan region 14 and whether the scan target is positioned askew.

Description will be made on a method of determining whether the scan target is placed or not. The method will be described with respect to a case where there is external disturbing light and a case where there is no external disturbing light.

Figure 5:
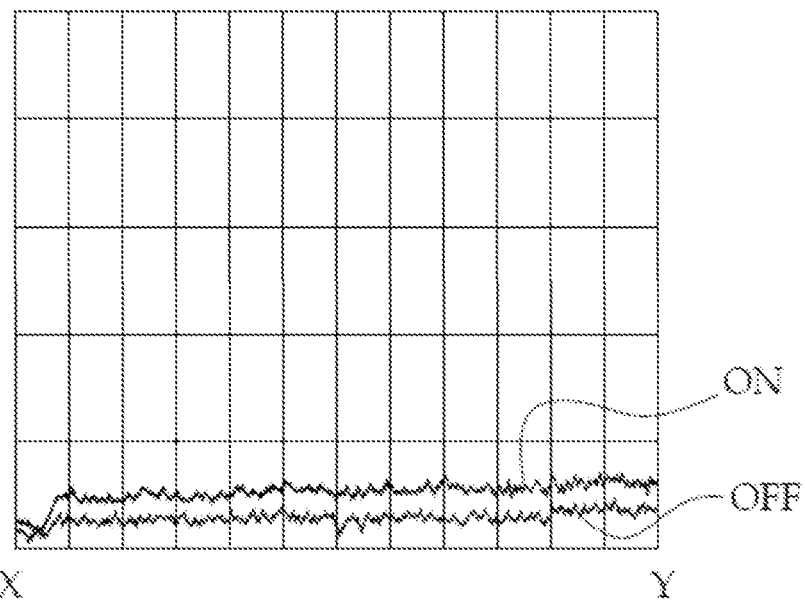
FIGS. 5A and 5B show output signals of a light receiving element array in case where there is no external disturbing light.
Figure 5:
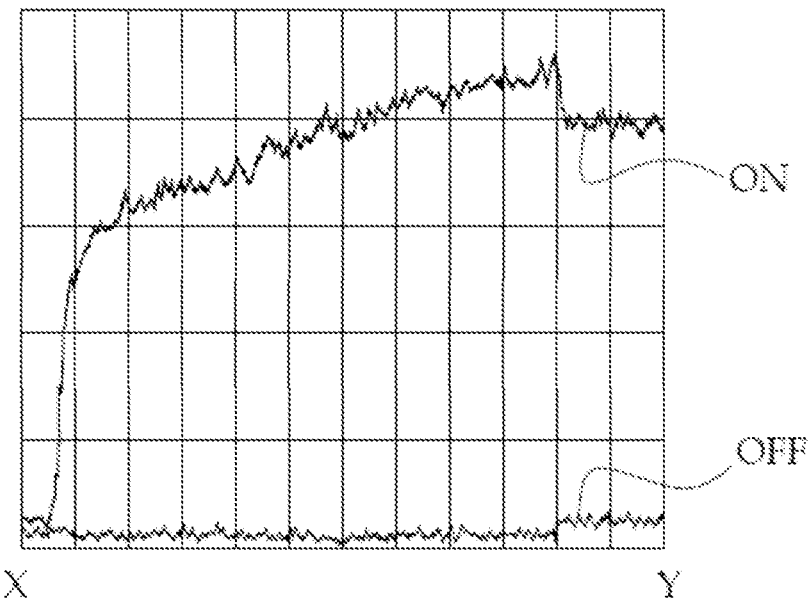

Referring first to FIGS. 5A and 5B, description will be made on a case where there is no external disturbing light. FIG. 5A shows output signals in case where there is no scan target, and FIG. 5B shows output signals in case where there is a scan target.

In case where there is no scan target, if a line between X and Y points is scanned with the light source 32 turned on, no light is inputted to the light receiving element array 34 because the light irradiated from the light source 32 is not reflected. Thus, the signal value outputted from the light receiving element array 34, excluding noises, is substantially zero over the entire line section between the X and Y points. If the line between the X and Y points is scanned with the light source 32 turned off, no light is inputted to the light receiving element array 34 because light is not irradiated from the light source 32. Thus, the signal value outputted from the light receiving element array 34 is substantially zero over the entire line section between the X and Y points. Consequently, if the output signal value available when the light source 32 is turned off is subtracted from the output signal value available when the light source 32 is turned on, it is possible to get a differential value substantially equal to zero over the entire line section between the X and Y points.

In case where there is a scan target, if a line between X and Y points is scanned with the light source 32 turned on, the light irradiated from the light source 32 is reflected by the scan target and is inputted to the light receiving element array 34. Thus, the signal value outputted from the light receiving element array 34 in the line section on which the scan target is placed becomes a positive value which varies depending on the gradation of the scan target. If the line between the X and Y points is scanned with the light source 32 turned off, no light is inputted to the light receiving element array 34 because light is not irradiated from the light source 32. Thus, the signal value outputted from the light receiving element array 34 is substantially zero over the entire line section between the X and Y points. Consequently, if the output signal value available when the light source 32 is turned off is subtracted from the output signal value available when the light source 32 is turned on, it is possible to get a differential value substantially equal to the positive value which is obtained when the light source is turned on and which is changed depending on the gradation of the scan target.

Consequently, if there is no external disturbing light and if a differential value obtained by subtracting the output signal value available when scanning is performed with the light source 32 turned off, from the output signal value available when scanning is performed with the light source 32 turned on, is substantially zero, it is determined that the scan target is not placed. If the differential value is a positive value equal to or larger than a predetermined value, it is determined that the scan target is placed.

Figure 6:
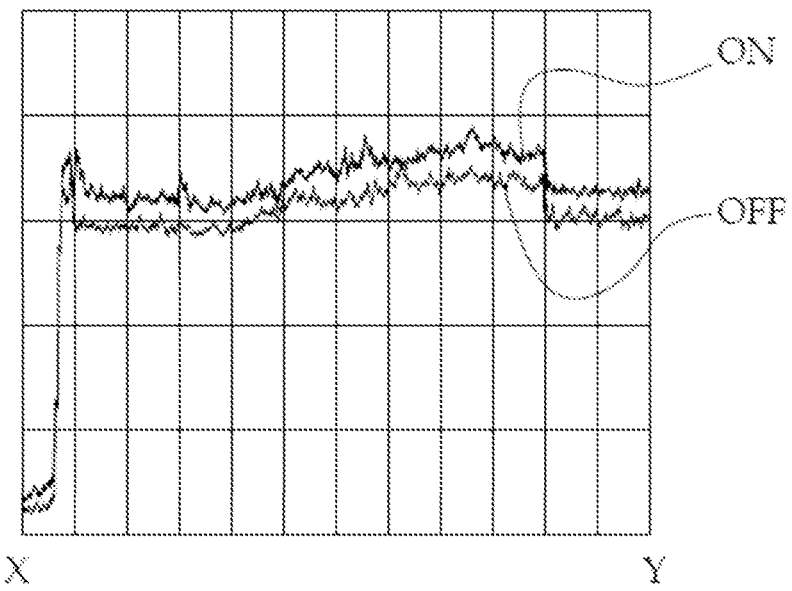
FIGS. 6A and 6B show output signals of a light receiving element array in case where there is external disturbing light.
Figure 6:
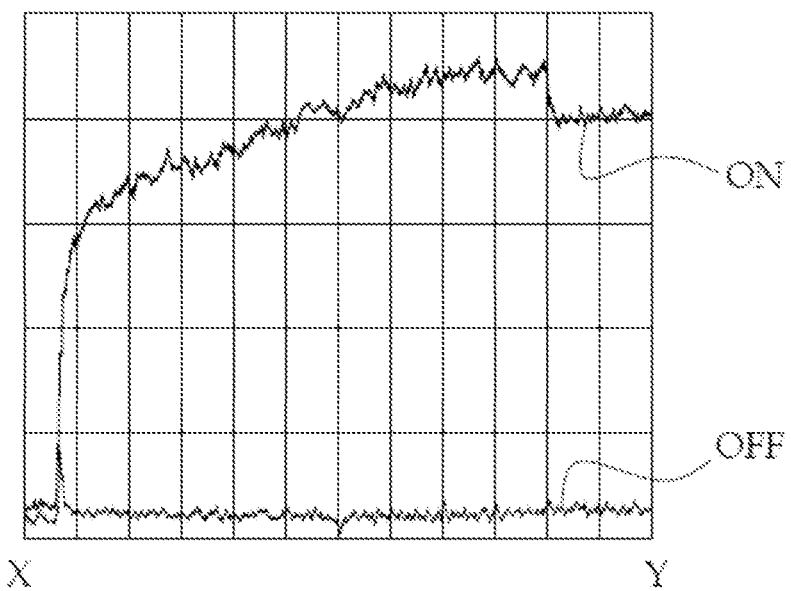

Referring next to FIGS. 6A and 6B, description will be made on a case where there is external disturbing light. FIG. 6A shows output signals in case where there is no scan target, and FIG. 6B shows output signals in case where there is a scan target.

In case where there is no scan target, if a line between X and Y points is scanned with the light source 32 turned on, no light is inputted to the light receiving element array 34 because the light irradiated from the light source 32 is not reflected. However, external disturbing light is directly inputted to the light receiving element array 34. Therefore, the signal value outputted from the light receiving element array 34 becomes a positive value proportional to the amount of the external disturbing light. Even if the line between the X and Y points is scanned with the light source 32 turned off, external disturbing light is directly inputted to the light receiving element array 34. Therefore, the signal value outputted from the light receiving element array 34 becomes a positive value proportional to the amount of the external disturbing light. Consequently, if the output signal value available when the light source 32 is turned off is subtracted from the output signal value available when the light source 32 is turned on, it is possible to get a differential value substantially equal to zero over the entire line section between the X and Y points as in the case where there is no external disturbing light.

In case where there is a scan target, if a line between X and Y points is scanned with the light source 32 turned on, the light irradiated from the light source 32 is reflected by the scan target and is inputted to the light receiving element array 34. The external disturbing light is cut off by the scan target and, therefore, is negligible. Thus, the signal value outputted from the light receiving element array 34 becomes a positive value which varies depending on the gradation of the scan target. If the line between the X and Y points is scanned with the light source 32 turned off, no light is irradiated from the light source 32. The external disturbing light is cut off by the scan target. Therefore, no light is inputted to the light receiving element array 34. Thus, the signal value outputted from the light receiving element array 34 is substantially zero. Consequently, if the output signal value available when the light source 32 is turned off is subtracted from the output signal value available when the light source 32 is turned on, it is possible to get a differential value substantially equal to the positive value which is obtained when the light source 32 is turned on and which is changed depending on the gradation of the scan target.

As mentioned above, the method of detecting the scan target using a difference between the output signals of the light receiving element array 34 obtained by performing a scan operation with the light source 32 turned on and then performing a scan operation with the light source 32 turned off can detect the scan target regardless of the existence and absence of the external disturbing light.

In a nutshell, if the difference between the output signals is substantially zero regardless of the existence and absence of the external disturbing light, it is determined that a scan target is not placed. If the difference between the output signals is equal to the positive value which varies depending on the gradation of the scan target, it is determined that a scan target is placed.

The control unit can use the following method to determine whether a scan target is correctly placed.

Figure 7:
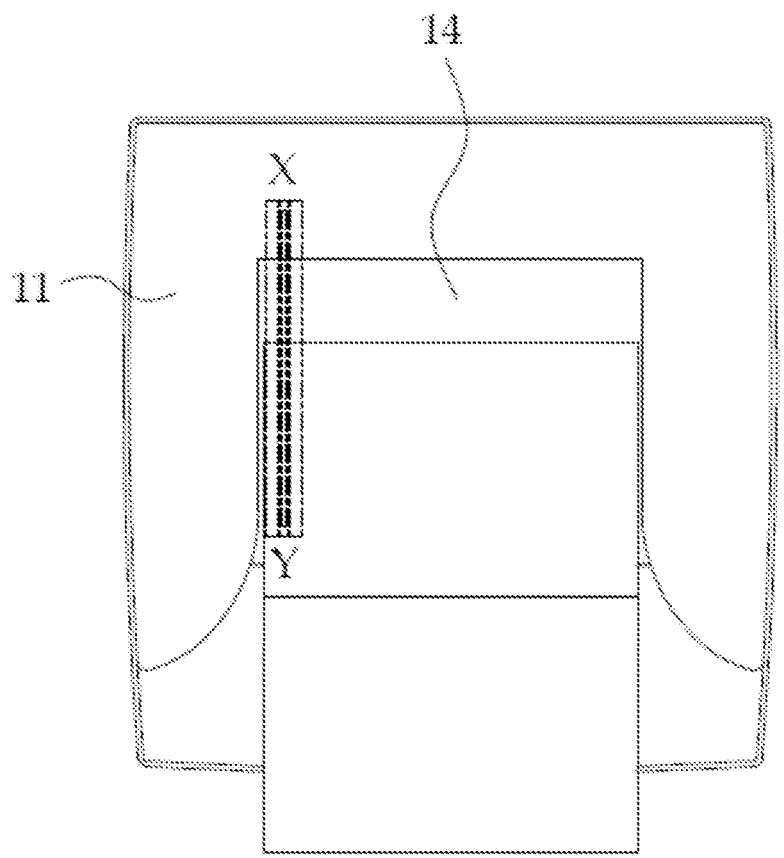
FIG. 7 is a view for explaining a case where a scan target is not correctly placed on the scanner.
Figure 8:
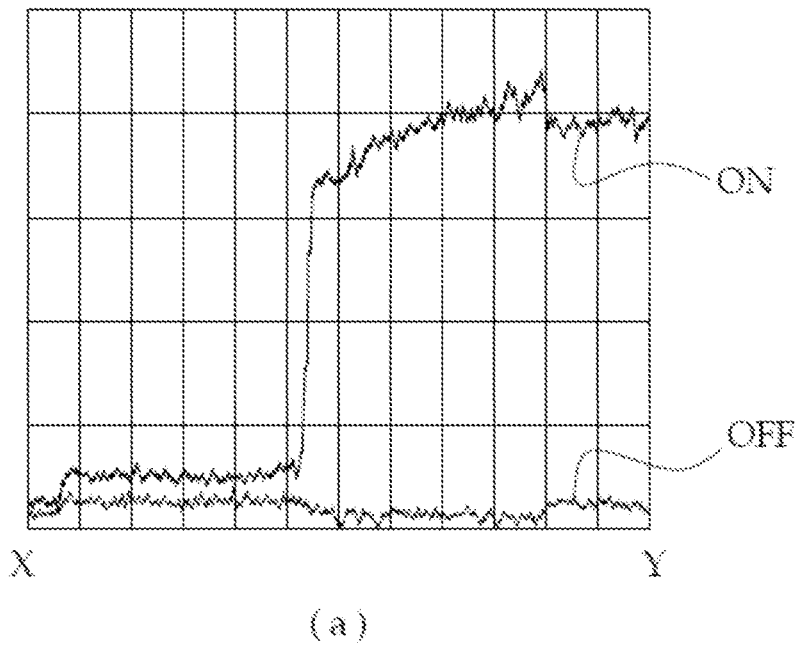
FIGS. 8A and 8B show output signals of a light receiving element array in case where a scan target is not correctly placed on the scanner.
Figure 8:
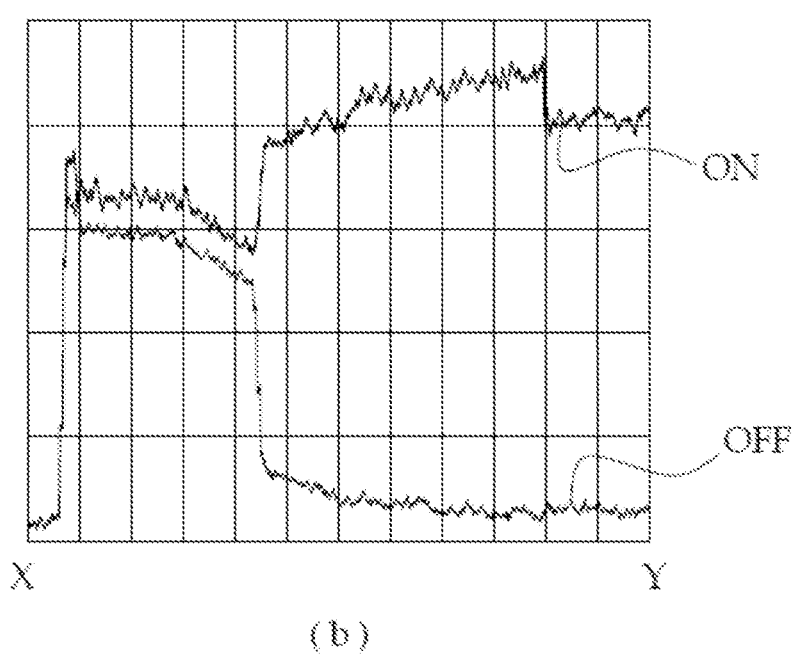

As shown in FIG. 7, if the upper end of a scan target is not correctly placed in a reference position, namely a scan start position, but is placed away from the reference position, a difference between output signals in the upper portion on which the scan target is not placed (in the left portion in FIGS. 8A and 8B) is substantially zero as illustrated in FIGS. 8A and 8B. The control unit determines that a scan target is not ready for scan. FIG. 8A shows output signals in case where external disturbing light does not exist, and FIG. 8B shows output signals in case where external disturbing light exists. By determining whether a difference between output signals is a positive value equal to or larger than a predetermined reference value over the entire line section between the X and Y points, it is possible to determine whether a scan target is placed in a right position.

Figure 9:
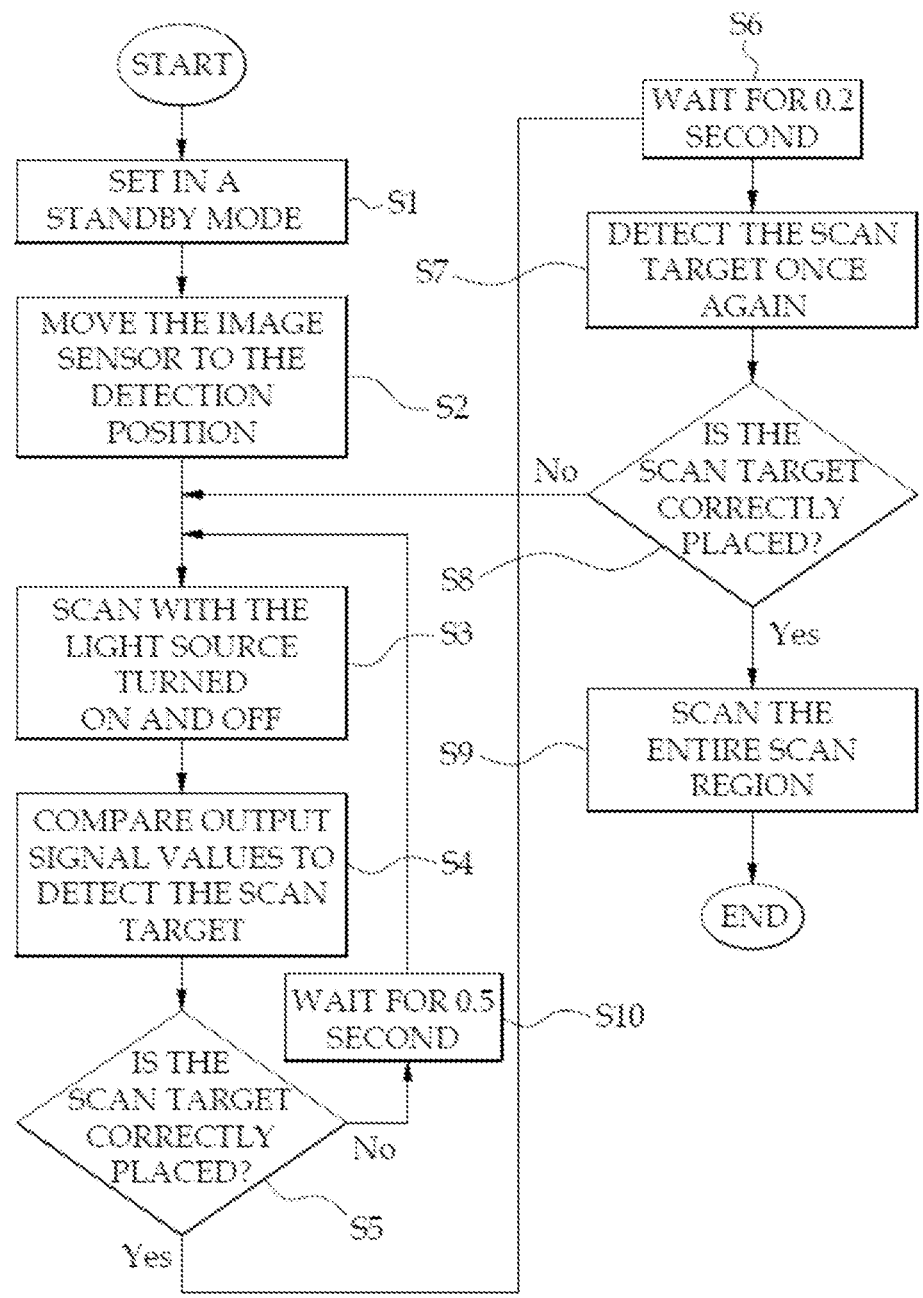
FIG. 9 is a flowchart illustrating a scan method according to the present invention.

A scan method for automatically detecting a scan target will now be described in more detail with reference to FIG. 9.

If the scanner is set in a standby mode (step S1), the image sensor 30 is moved to a scan start position, i.e., a detection position (step S2).

In this state, the scanner is intermittently operated at a regular time interval (step S3). More specifically, in step S3, the scanner repeatedly performs, at a regular time interval, an operation of scanning a line between X and Y points with the light source 32 turned on and then scanning the line between the X and Y points with the light source 32 turned off. The output signal values of the light receiving element array 34 obtained by performing the scanning operation with the light source 32 turned on and off are stored in the memory of the control unit.

Next, the microprocessor of the control unit calculates a difference between the output signal values of the light receiving element array 34 obtained by turning on and off the light source 32 and stored in the memory (step S4). If the difference resulting from the calculation is a positive value equal to or higher than a predetermined value, it is determined that a scan target is placed in the scan region 14.

Subsequently, the differences between the output signal values in the respective positions between the X and Y points are checked to determine whether a scan target is correctly positioned in the scan region 14 (step S5). If the differences between the output signal values are positive values equal to or larger than a predetermined value over the entire line section between the X and Y points, it is determined that the scan target is correctly placed. If the difference between the output signal values is substantially zero in a certain position, it is determined that the scan target is not correctly placed.

If it is determined that the scan target is correctly placed, the flow waits for about 0.2 second (step S6). Then, it is determined once again whether a scan target is placed in the scan region 14 (step S7). Determination is made as to whether the scan target is correctly placed (step S8). If it is determined at this time that the scan target is correctly placed, a scanning operation is performed with respect to the entire scan region 14 (step S9). If it is determined that the scan target is not correctly placed, the flow returns to step S3.

If it is determined in step S5 that the scan target is not correctly placed, the flow waits for about 0.5 second during which the scan target can be correctly placed (step S10). Then, Steps S3, S4 and S5 are repeated.

While a certain preferred embodiment of the invention has been described above, the scope of the present invention is not limited to the aforementioned specific embodiment. It will be apparent to those skilled in the relevant art that various changes, modifications and substitutions may be made without departing from the scope of the invention defined in the claims. Such changes, modifications and substitutions shall be construed to fall within the scope of the present invention.

For example, if it is allowed to perform a scanning operation in a state in which a scan target is not correctly placed, the entire scan target may be scanned just after confirming that the scan target is placed in the scan region and without confirming whether the scan target is correctly placed.

What is claimed is:

1. A scanner for automatically detecting a scan target, comprising:
   a scan region configured to support the scan target;
   an image sensor including
      a light source irradiating light toward the scan region, and
      a light receiving element array sensing the light incident thereon through the scan region;
   a drive unit configured to linearly move the image sensor across the scan region; and
   a control unit configured to control the scanner, the control unit
      moving the light source of the image sensor and the drive unit to a detection position,
      first scanning the scan region with the light source turned on,
      obtaining a first output signal value from the light receiving element array sensed in the first scanning,
      second scanning the scan region with the light source turned off,
      obtaining a second output signal value from the light receiving element array sensed in the second scanning,
      obtaining a differential value by subtracting the second output signal value from the first output signal value, and
      determining whether the scan target is placed in the scan region, wherein the control unit determines that the scan target is placed in the scan region if the differential value is less than or equal to a predetermined value, and that the scan target is not placed in the scan region if the differential value is greater than the predetermined value.

2. The scanner of claim 1, wherein the control unit is determines whether the scan target is correctly placed, by comparing first output signal values obtained from individual light receiving elements of the light receiving element array with the light source turned on and second output signal values obtained from the individual light receiving elements of the light receiving element array with the light source turned off.

3. The scanner of claim 1, wherein the image sensor is a contact image sensor including a lens array for transmitting the light incident thereon through the scan region to the light receiving element array.

4. A scan method with automatically detecting a scan target, comprising:
   (a) providing a scanner which includes
      an image sensor including a light source for irradiating light toward a scan region and a light receiving element array for sensing the light incident thereon through the scan region, a drive unit configured to linearly move the image sensor across the scan region, and
a control unit configured to control the image sensor and the drive unit;
(b) moving the light source of the image sensor and the drive unit to a detection position;
(c) first scanning the scan region with the light source turned on, sensing, by the light receiving element array, the light incident thereon through the scan region and obtaining, by the control unit, a first output signal value from the light receiving element array;
(d) second scanning the scan region with the light source turned off, sensing, by the light receiving element array, the light incident thereon through the scan region, and obtaining, by the control unit, a second output signal value from the light receiving element array;
(e) obtaining, by the control unit, a differential value by subtracting the second output signal value from the first output signal value; and
(f) determining, by the control unit, that the scan target is placed in the scan region if the differential value is less than or equal to a predetermined value, and that the scan target is not placed in the scan region if the differential value is greater than the predetermined value.

5. The scan method of claim 4, further comprising:
(g) determining, by the control unit, whether the scan target is correctly placed, by comparing first output signal values obtained from individual light receiving elements of the light receiving element array with the light source turned on and second output signal values obtained from the individual light receiving elements of the light receiving element array with the light source turned off.

6. The scan method of claim 5, wherein, if it is determined in the step (g) that the scan target is not correctly placed, the steps (b) to (f) are repeated after waiting for a predetermined time such that the scan target is correctly placed.

* * * * *